E. J. HEITMAN.
RECORDING INSTRUMENT.
APPLICATION FILED JAN. 7, 1916.

1,256,130.

Patented Feb. 12, 1918.

Witness
Daniel Webster, Jr.

Inventor
Edwin Joseph Heitman
By Francis T. Chambers
his Attorney

UNITED STATES PATENT OFFICE.

EDWIN JOSEPH HEITMAN, OF PHILADELPHIA, PENNSYLVANIA, ASSIGNOR TO THE BROWN INSTRUMENT COMPANY, OF PHILADELPHIA, PENNSYLVANIA, A CORPORATION OF PENNSYLVANIA.

RECORDING INSTRUMENT.

1,256,130.     Specification of Letters Patent.     Patented Feb. 12, 1918.

Application filed January 7, 1916. Serial No. 70,713.

*To all whom it may concern:*

Be it known that I, EDWIN JOSEPH HEITMAN, a citizen of the United States of America, and resident of Philadelphia, in the county of Philadelphia and State of Pennsylvania, have invented certain new and useful Improvements in Recording Instruments, of which the following is a true and exact description, reference being had to the accompanying drawings, which form a part thereof.

My present invention relates to recording instruments of the type in which a record is made on a transparent traveling record sheet or chart interposed between a sheet of carbon paper or other transfer material and a marking point carried by the movable element of some form of measuring device. The object of my invention is to make the portion of the record curve already drawn on the record sheet more plainly visible than it has been heretofore, while the record sheet is in its operative position in the recording instrument.

The various features of novelty which characterize my invention are pointed out with particularity in the claims annexed to and forming a part of this specification. For a better understanding of the invention, however, reference should be had to the accompanying drawings and descriptive matter. While my invention in its broader aspects is of utility with other forms of recording instruments, it is of especial utility in connection with instruments in which the record is formed on a chart in the form of a disk rotated about its center as an axis, and in the drawings I have illustrated the use of my invention in connection with an instrument of this type.

Figure 1:
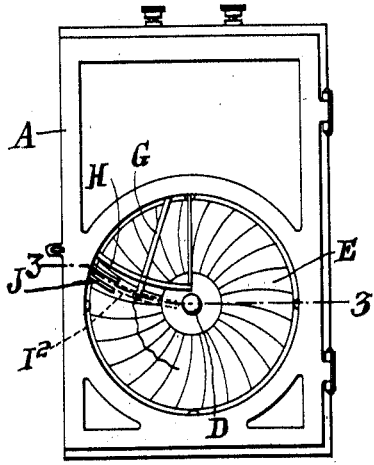
Figure 1 is a plan view of a recording instrument.
Figure 2:
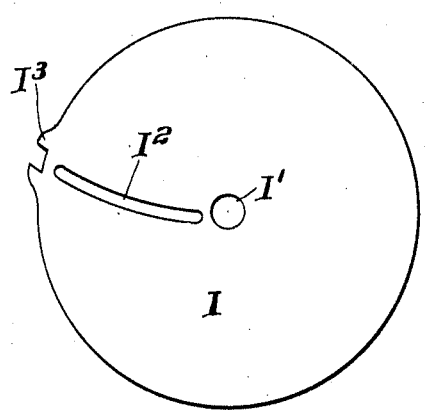
Fig. 2 is a plan view of the opaque curtain member which I employ in the instrument shown.
Figure 3:
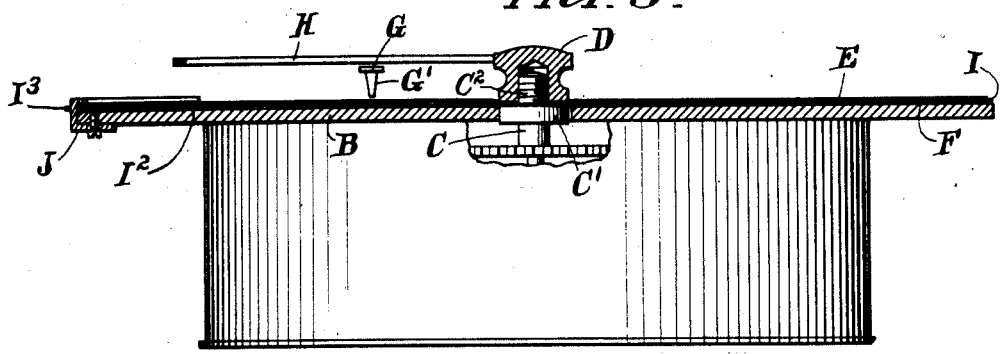
Fig. 3 is a section through a portion of the instrument taken along the line 3—3 of Fig. 1, but on a much larger scale.
Figure 4:
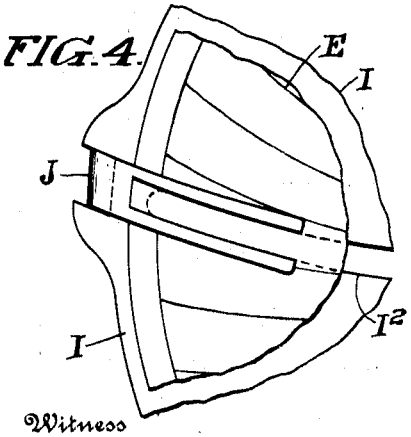
Fig. 4 is a plan view of a portion of the apparatus taken on a somewhat larger scale than Fig. 2.
Figure 5:
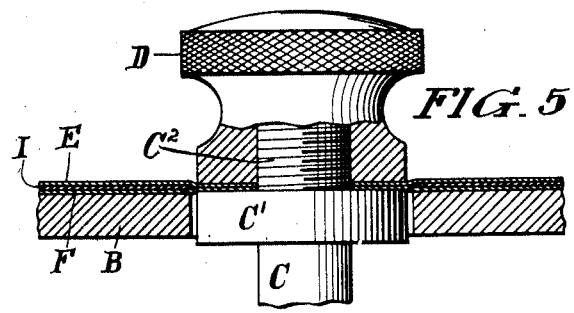
Fig. 5 is a partial section taken similarly to Fig. 2, but on a still larger scale.

In the drawings, A represents the instrument case within which is mounted a table or record support B. Through a central aperture in the table B projects an arbor C driven by the clock mechanism mounted beneath the table B. The arbor C is formed with a collar C'. A clamping nut D screwed on a threaded extension $C^2$ of the arbor C forms a means for clamping a record sheet E and a transfer sheet F in place against the collar C'. These sheets are in the form of disks having small central apertures to receive the threaded extension $C^2$ of the arbor C. The disk E is formed of more or less perfectly transparent paper, and ordinarily has printed thereon scale markings and suitable identifying symbols. The transfer sheet F may well be, and in practice ordinarily will be, formed of carbon paper. The pointer G of the movable meter element of the instrument is mounted to swing about an axis parallel to that of the arbor C so as to carry the marking stylus or projection G' of the pointer along a path curved but generally radial with respect to the underlying record disk E. Normally the pointer clears both the record sheet and the depressing boom H. The latter is intermittently moved, however, by mechanism not shown, toward the table B to engage the pointer and force the portion G' against the record disk E and thereby cause a mark to be made on the under side of the record disk by the transfer medium, the record curve being thus formed by a succession of closely spaced dots.

In so far as above described the apparatus disclosed possesses nothing novel with me, but on the contrary is of a type well known and in common use for recording electrical measurements of various kinds.

With an instrument of the kind described the curve drawn on the record sheet, is clearly visible when the chart is removed from the instrument, but may be quite difficult to follow under unfavorable conditions while the chart is in its operative position in the instrument. This is due to the fact that the transfer sheet F forms a background seen through the transparent record sheet, which is of the same, or approximately the same color as the record curve made on the under side of the record disk. The difficulty in reading the chart is especially great when the recording meter is used in high temperature measurements and the observers are temporarily somewhat blinded by the glare to which their eyes have been subjected.

To make the record curve clearly readable under all conditions while the chart is in place in the instrument, I place an opaque curtain of suitable contrasting color between the transparent record sheet and the transfer sheet. In the apparatus shown the opaque curtain I employed is a disk of ordinary white paper which has ample opacity for the purpose. The disk is formed with a central aperture I' somewhat larger in diameter than the clamping surfaces of the collar C' and nut D, and with a curved slot I² the center line of which corresponds with the arc of movement of the marking point G' when the apparatus is assembled. The curtain I, must be held against rotative movement, and this is accomplished in the apparatus shown by forming the paper disk I with peripheral projections or shoulders I³ which straddle the stationary holding device J. As shown, the device J is in the form of a clip secured to the under side of the table C and projecting over the face of the table toward the center thereof for some distance. The projecting portion is slotted to clear the marking projection G' from the pointer G, and forms a guide preventing any tendency of the curtain I to wrinkle or buckle at the margin of the slot I².

With the construction described it will be apparent that the screen I forms a background for the transparent record disk which makes the record traced thereon clearly visible. While it is of course possible to make the screen out of other material than ordinary paper, the use of such material is especially advantageous because of its light weight, flexibility, smoothness and cheapness. Because of the characteristics just noted, the paper curtain may be readily removed and put back in place when necessary, and in operation, the record and transfer disks E and F exert no appreciable frictional pull on the paper curtain tending to cause it to share their rotative movement, and a soiled or worn paper curtain may be replaced by a new one at insignificant expense. The aperture I' need be but little larger in diameter than the clamping surface of the collar C' and nut D to avoid binding and hence the curtain disk may be centered with all necessary exactness by the collar and nut. It is to be noted that for convenience of illustration the sheets E, F and I are shown in the drawings as much thicker than they really are.

While in accordance with the provisions of the statutes I have illustrated and described the best form of my invention now known to me, it will be apparent to those skilled in the art that changes may be made in the form of my invention without departing from its spirit, and that some features of my invention can be used without a corresponding use of other features.

Having now described my invention, what I claim as new and desire to secure by Letters Patent, is:—

1. A recording instrument comprising a traveling record sheet of transparent material, a sheet of transfer material at one side of the record sheet, and a marking device at the other side of the record sheet for engaging the latter to press it against the transfer sheet and thereby mark the record sheet on the side adjacent the transfer sheet, and in combination therewith, a stationary opaque screen of a color contrasting with that of the transfer sheet interposed between the record and transfer sheets and shaped to clear the path of the marking device.

2. A recording instrument comprising a record supporting table, a rotating arbor projecting therefrom, a record disk of transparent material and a disk of transfer material centrally secured to said arbor with the transfer disk between the record disk and the table and resting on the latter, a marking device movable toward and away from said arbor along a prescribed path and engaging the record disk to press it against the transfer disk and thereby cause the latter to mark the adjacent side of the record disk, and in combination therewith, a thin opaque curtain interposed between the record and transfer disks and formed with a central aperture loosely surrounding said arbor and with a slot, the side edges of which lie on opposite sides of the path of movement of the marking device, and means engaging said curtain to hold it against rotative movement.

3. A recording instrument comprising a record supporting table, a rotating arbor projecting therefrom, a record disk of transparent material and a disk of transfer material centrally secured to said arbor with the transfer disk between the record disk and the table and resting on the latter, a marking device movable toward and away from said arbor along a prescribed path and engaging the record disk to press it against the transfer disk and thereby cause the latter to mark the adjacent side of the record disk, and in combination therewith, a thin opaque curtain interposed between the record and transfer disks and formed with a central aperture loosely surrounding said arbor and with a slot, the side edges of which lie on opposite sides of the path of movement of the marking device, and having a portion extending beyond the periphery of said disks, and means engaging said projecting portion to hold the curtain against rotative movement.

4. A recording instrument comprising a record supporting table, a rotating arbor projecting therefrom, a record disk of transparent material and a disk of transfer material centrally secured to said arbor with the transfer disk between the record disk and the table and resting on the latter, a marking device movable toward and away from said arbor along a prescribed path and engaging the record disk to press it against the transfer disk and thereby cause the latter to mark the adjacent side of the record disk, and in combination therewith, a thin opaque curtain interposed between the record and transfer disks and formed with a central aperture loosely surrounding said arbor and with a slot, the side edges of which lie on opposite sides of the path of movement of the marking device, and having a portion extending beyond the periphery of said disks, and a stationary slotted part engaging the projecting portion of said curtain to hold it against rotation and extending over said table toward said arbor with its slot in register with said curtain slot.

5. A thin flexible curtain disk for the purpose described formed with a central aperture, a radial slot and a peripheral positioning shoulder.

Mr. EDWIN JOSEPH HEITMAN.